(12) United States Patent
Eiriksson et al.

(10) Patent No.: US 7,616,563 B1
(45) Date of Patent: Nov. 10, 2009

(54) METHOD TO IMPLEMENT AN L4-L7 SWITCH USING SPLIT CONNECTIONS AND AN OFFLOADING NIC

(75) Inventors: Asgeir Thor Eiriksson, Sunnyvale, CA (US); Wael Noureddine, Mountain View, CA (US)

(73) Assignee: Chelsio Communications, Inc., Sunnyvale, CA (US)

( * ) Notice: Subject to any disclaimer, the term of this patent is extended or adjusted under 35 U.S.C. 154(b) by 553 days.

(21) Appl. No.: 11/356,850

(22) Filed: Feb. 17, 2006

Related U.S. Application Data

(63) Continuation-in-part of application No. 11/330,898, filed on Jan. 12, 2006, which is a continuation-in-part of application No. 11/313,003, filed on Dec. 19, 2005, which is a continuation-in-part of application No. 11/282,933, filed on Nov. 18, 2005, which is a continuation-in-part of application No. 11/217,661, filed on Aug. 31, 2005.

(51) Int. Cl.
*H04L 12/26* (2006.01)
*H04L 12/28* (2006.01)
*H04J 3/16* (2006.01)
(52) U.S. Cl. .................. 370/230; 370/389; 370/469
(58) Field of Classification Search ......... 370/229–235, 370/389, 391, 392, 394, 395.1, 400, 401, 370/465, 466, 469
See application file for complete search history.

(56) References Cited

U.S. PATENT DOCUMENTS

| | | | |
|---|---|---|---|
| 4,445,116 A | 4/1984 | Grow | |
| 4,533,996 A | 8/1985 | Hartung et al. | |
| 5,497,476 A | 3/1996 | Oldfield et al. | |
| 5,778,189 A * | 7/1998 | Kimura et al. | 709/236 |
| 6,087,581 A | 7/2000 | Emmer et al. | |
| 6,226,680 B1 | 5/2001 | Boucher et al. | 709/230 |
| 6,240,094 B1 | 5/2001 | Schneider | |
| 6,247,060 B1 | 6/2001 | Boucher et al. | 709/238 |
| 6,334,153 B2 | 12/2001 | Boucher et al. | 709/230 |
| 6,389,479 B1 | 5/2002 | Boucher et al. | 709/243 |

(Continued)

OTHER PUBLICATIONS

TRM Technologies, Inc., "*L4/L7 Switching*," Downloaded from http://www.trm.ca/pages/t-tech7.html on Feb. 16, 2006, 3 Pages.
Madsen et al., "*Wireless Data Communication*," Fall 2003 Presentation, Wireless Networks Division (WING), Allborg University.
Yocum et al., "*Anypoint: Extensible Transport Switching on the Edge*," Proceedings of the 4th USENIX Symposium on Internet Technologies and Systems, Mar. 26-28, 2003, Seattle, WA, USA.

(Continued)

*Primary Examiner*—Hong Cho
(74) *Attorney, Agent, or Firm*—Beyer Law Group LLP

(57) ABSTRACT

A method of operating intelligent network interface circuitry includes the network interface circuitry coupling a core processor to a network to facilitate communication over the network between the core processor and at least a first peer and a second peer. A first connection connects to the first peer and a second connection connects to the second peer. The network interface circuitry receives data packets from the first peer via the network on the first connection, according to a first particular protocol. The network interface circuitry processes the received data, including associating, with the second connection, data that is at least a portion of the data packets received on the first connection, such that the data received by the intelligent network interface circuitry on the first connection is switched to be outgoing from the intelligent network interface circuitry on the second connection, according to a second particular protocol.

23 Claims, 5 Drawing Sheets

U.S. PATENT DOCUMENTS

| | | | |
|---|---|---|---|
| 6,393,487 B2 | 5/2002 | Boucher et al. | 709/238 |
| 6,397,316 B2 | 5/2002 | Fesas, Jr. | |
| 6,401,177 B1 | 6/2002 | Koike | |
| 6,427,171 B1 | 7/2002 | Craft et al. | 709/230 |
| 6,427,173 B1 | 7/2002 | Boucher et al. | 709/238 |
| 6,434,620 B1 | 8/2002 | Boucher et al. | 709/230 |
| 6,470,415 B1 | 10/2002 | Starr et al. | 711/104 |
| 6,510,164 B1 | 1/2003 | Ramaswamy et al. | |
| 6,591,302 B2 | 7/2003 | Boucher et al. | 709/230 |
| 6,594,268 B1 | 7/2003 | Aukia et al. | |
| 6,625,671 B1* | 9/2003 | Collette et al. | 710/52 |
| 6,658,480 B2 | 12/2003 | Boucher et al. | 709/239 |
| 6,681,244 B1 | 1/2004 | Cross et al. | |
| 6,687,758 B2 | 2/2004 | Craft et al. | 709/250 |
| 6,697,868 B2 | 2/2004 | Craft et al. | 709/230 |
| 6,708,223 B1 | 3/2004 | Wang et al. | |
| 6,708,232 B2* | 3/2004 | Obara | 710/11 |
| 6,717,946 B1 | 4/2004 | Hariguchi et al. | |
| 6,751,665 B2 | 6/2004 | Philbrick et al. | 709/224 |
| 6,757,245 B1 | 6/2004 | Kuusinen et al. | |
| 6,757,746 B2 | 6/2004 | Boucher et al. | 709/250 |
| 6,798,743 B1 | 9/2004 | Ma et al. | |
| 6,807,581 B1 | 10/2004 | Starr et al. | 709/250 |
| 6,813,652 B2 | 11/2004 | Stadler et al. | |
| 6,862,648 B2* | 3/2005 | Yatziv | 710/315 |
| 6,925,055 B1 | 8/2005 | Erimli et al. | |
| 6,941,386 B2 | 9/2005 | Craft et al. | 709/250 |
| 7,031,267 B2 | 4/2006 | Krumel | |
| 7,093,099 B2 | 8/2006 | Bodas et al. | |
| 7,114,096 B2 | 9/2006 | Freimuth et al. | |
| 7,133,902 B2 | 11/2006 | Saha et al. | |
| 7,133,914 B1 | 11/2006 | Holbrook | |
| 7,191,318 B2 | 3/2007 | Tripathy et al. | |
| 7,239,642 B1* | 7/2007 | Chinn et al. | 370/401 |
| 7,254,637 B2 | 8/2007 | Pinkerton et al. | |
| 7,260,631 B1 | 8/2007 | Johnson et al. | |
| 7,284,047 B2 | 10/2007 | Barham et al. | |
| 7,313,623 B2 | 12/2007 | Elzur et al. | |
| 7,376,147 B2* | 5/2008 | Seto et al. | 370/465 |
| 7,408,906 B2* | 8/2008 | Griswold et al. | 370/338 |
| 7,453,892 B2 | 11/2008 | Buskirk et al. | |
| 2001/0010046 A1 | 7/2001 | Muyres et al. | |
| 2001/0021949 A1 | 9/2001 | Blightman et al. | 709/219 |
| 2001/0036196 A1 | 11/2001 | Blightman et al. | 370/465 |
| 2001/0037406 A1 | 11/2001 | Philbrick et al. | 709/250 |
| 2002/0039366 A1 | 4/2002 | Sano | |
| 2002/0087732 A1 | 7/2002 | Boucher et al. | 709/250 |
| 2002/0091844 A1 | 7/2002 | Craft et al. | 709/230 |
| 2002/0095519 A1 | 7/2002 | Philbrick et al. | 709/250 |
| 2002/0156927 A1 | 10/2002 | Boucher et al. | 709/250 |
| 2002/0161919 A1 | 10/2002 | Boucher et al. | 709/238 |
| 2003/0018516 A1 | 1/2003 | Ayala et al. | |
| 2003/0035436 A1 | 2/2003 | Denecheau et al. | |
| 2003/0140124 A1 | 7/2003 | Burns | 709/220 |
| 2003/0200284 A1 | 10/2003 | Philbrick et al. | 709/219 |
| 2003/0204631 A1 | 10/2003 | Pinkerton et al. | |
| 2004/0003094 A1 | 1/2004 | See | |
| 2004/0003126 A1 | 1/2004 | Boucher et al. | 709/250 |
| 2004/0030745 A1* | 2/2004 | Boucher et al. | 709/203 |
| 2004/0054813 A1 | 3/2004 | Boucher et al. | 709/250 |
| 2004/0062246 A1 | 4/2004 | Sharp et al. | 370/392 |
| 2004/0062246 A1 | 4/2004 | Boucher et al. | 370/392 |
| 2004/0064578 A1 | 4/2004 | Boucher et al. | 709/236 |
| 2004/0064589 A1 | 4/2004 | Boucher et al. | 709/250 |
| 2004/0064590 A1 | 4/2004 | Starr et al. | 709/250 |
| 2004/0073703 A1 | 4/2004 | Boucher et al. | 709/245 |
| 2004/0078480 A1 | 4/2004 | Boucher et al. | 709/237 |
| 2004/0088262 A1 | 5/2004 | Boucher et al. | 705/65 |
| 2004/0100952 A1 | 5/2004 | Boucher et al. | 370/389 |
| 2004/0111535 A1 | 6/2004 | Boucher et al. | 709/250 |
| 2004/0117509 A1 | 6/2004 | Craft et al. | 709/250 |
| 2004/0158640 A1 | 8/2004 | Philbrick et al. | 709/230 |
| 2004/0165592 A1 | 8/2004 | Chen et al. | |
| 2004/1058793 | 8/2004 | Blightman et al. | 714/758 |
| 2004/0190533 A1* | 9/2004 | Modi et al. | 370/400 |
| 2004/0199808 A1 | 10/2004 | Freimuth et al. | |
| 2004/0213235 A1 | 10/2004 | Marshall et al. | |
| 2004/0240435 A1 | 12/2004 | Craft et al. | 709/250 |
| 2005/0071490 A1 | 3/2005 | Craft et al. | 709/230 |
| 2005/0120037 A1* | 6/2005 | Maruyama et al. | 707/100 |
| 2005/0122986 A1 | 6/2005 | Starr et al. | 370/412 |
| 2005/0135378 A1 | 6/2005 | Rabie et al. | |
| 2005/0135412 A1 | 6/2005 | Fan | |
| 2005/0147126 A1 | 7/2005 | Qiu et al. | |
| 2005/0190787 A1 | 9/2005 | Kuik et al. | |
| 2005/0216597 A1 | 9/2005 | Shah et al. | |
| 2005/0259678 A1 | 11/2005 | Gaur | |
| 2005/0289246 A1 | 12/2005 | Easton et al. | |
| 2006/0031524 A1 | 2/2006 | Freimuth | |
| 2006/0039413 A1 | 2/2006 | Nakajima et al. | |
| 2006/0075119 A1 | 4/2006 | Hussain | |
| 2006/0080733 A1 | 4/2006 | Khosmood et al. | |
| 2006/0133267 A1 | 6/2006 | Alex et al. | |
| 2006/0206300 A1 | 9/2006 | Garg et al. | |
| 2006/0209693 A1 | 9/2006 | Davari et al. | |
| 2006/0221946 A1 | 10/2006 | Shalev et al. | |
| 2006/0281451 A1 | 12/2006 | Zur | |
| 2007/0064737 A1 | 3/2007 | Williams | |
| 2007/0110436 A1* | 5/2007 | Bennett | 398/37 |
| 2008/0002731 A1 | 1/2008 | Tripathy et al. | |
| 2008/0016511 A1 | 1/2008 | Hyder et al. | |
| 2008/0232386 A1 | 9/2008 | Gorti et al. | |

OTHER PUBLICATIONS

Office Action in U.S. Appl. No. 11/137,140 mailed Apr. 1, 2009.
Office Action in U.S. Appl. No. 11/130,898 mailed Apr. 2, 2009.
Office Action in U.S. Appl. No. 11/747,790 mailed May 12, 2009.
Office Action in U.S. Appl. No. 11/747,793 mailed Jun. 8, 2009.
Notice of Allowance in U.S. Appl. No. 11/313,003, mailed Jun. 8, 2008.
Allowed Claims from U.S. Appl. No. 11/313,003.
Office Action in U.S. Appl. No. 11/217,661 mailed Jun. 9, 2009.
Office Action in U.S. Appl. No. 10/474,500, mailed Oct. 4, 2007.
Office Action in U.S. Appl. No. 11/137,146, mailed Mar. 5, 2008.
Office Action in U.S. Appl. No. 11/137,140, mailed Feb. 5, 2008.
Office Action in U.S. Appl. No. 11/250,894, mailed Jun. 26, 2008.
Notice of Allowance in U.S. Appl. No. 10/474,500, mailed Jul. 1, 2008.
Allowed Claims from U.S. Appl. No. 10/474,500.
Office Action in U.S. Appl. No. 11/217,661, mailed Sep. 18, 2008.
Office Action in U.S. Appl. No. 11/313,003, mailed Aug. 22, 2008.
Office Action in U.S. Appl. No. 11/330,898, mailed Oct. 8, 2008.
Office Action in U.S. Appl. No. 11/137,146, mailed Nov. 3, 2008.
U.S. Appl. No. 60/690,465, filed Jun. 14, 2005.
U.S. Appl. No. 60/718,418, filed Sep. 19, 2005.
Office Action in U.S. Appl. No. 11/282,933 mailed Feb. 20, 2009.
Office Action in U.S. Appl. No. 11/250,894 mailed Jan. 26, 2009.
Clark et al., "*An Analysis of TCP Processing Overhead,*" IEEE Communications Magazine, Jun. 1989, pp. 23-29.
Woodside et al., "*The Protocol Bypass Concept for High Speed OSI Data Transfer,*" Research Paper. Available at:http://citeseer.ist.psu.edu/cache/papers/cs/26104/http:zSzzSzwww.sce.carleton.cazSzftpzSzpubzSzcmwzSzbpjan90.pdf/woodside90protocol.pdf.
Rütsche et al., "*TCP/IP on the Parallel Protocol Engine,*" High Performace Networking, (IV, C-14), Elsevier Science Publishers, B.V. North Holland 1993.
Thia et al., "*High-Speed OSI Protocol Bypass Algorithm with Window Flow Control,*" IFIP WG6.4 Third International Workshop on Protocols for High-Speed Networks, Stockholm, Sweden, May 13-15, 1992, pp. 53-68.

Thia et al., "*A Reduced Operation Protocol Engine (ROPE) for a Multiple-Layer Bypass Architecture*," Protocols for High-Speed Networks IV, 4th IFIP International Workshop, Aug. 10-12, 1994, Vancouver, B.C., Canada, pp. 224-239.

Rütsche et al., "*Architectures of Multimedia Communication Subsystems*," IFIP Transactions; vol. C-23 archive, Proceedings of the IFIP TC6 International Conference on Information Networks and Data Communication table of contents, pp. 217-230, Year of Publication: 1994.

International Search Report in PCT/US02/12679, dated Jul. 23, 2002.

* cited by examiner

Figure 1a : Stream of 4 TCP packets in send order from left to right
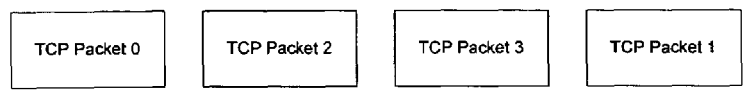
Figure 1b : Stream of 4 TCP packets receive order when Packet 1 is lost in transit and re-transmitted
Figure 1c : Stream of 4 TCP packets receive order when Packet 1 and 2 are reordered in transit

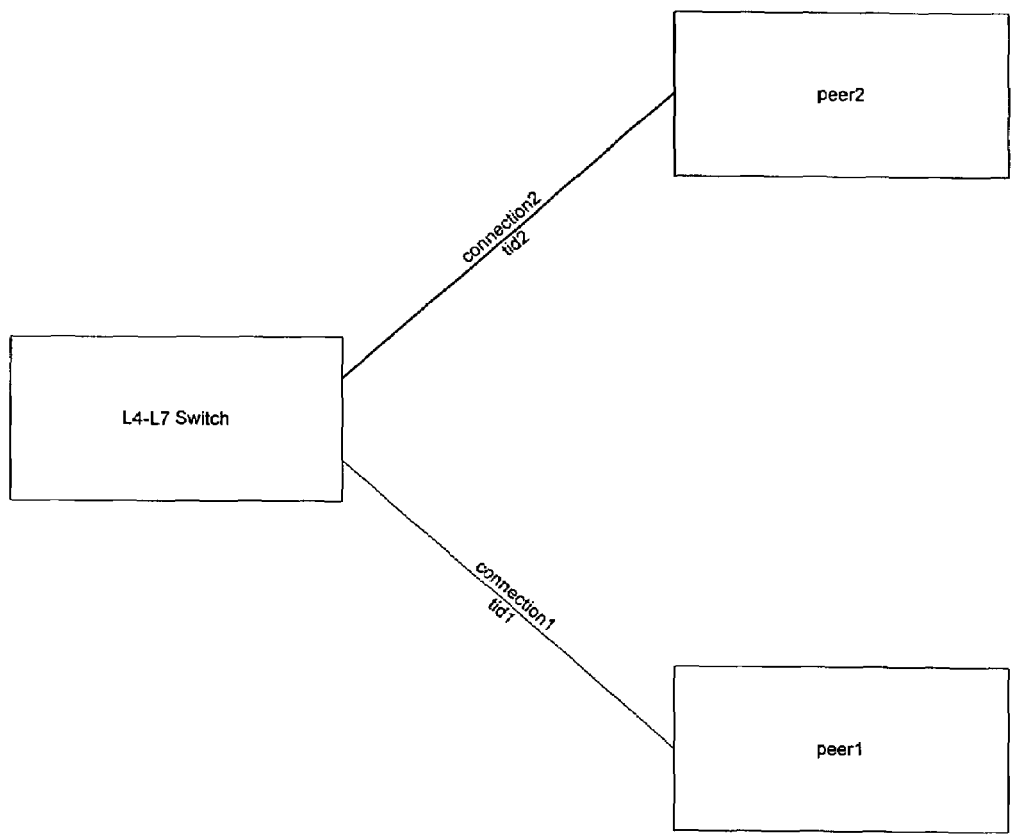
Figure 2a : L4-L7 Switch connecting peer1 and peer2 via connection1 and connection2

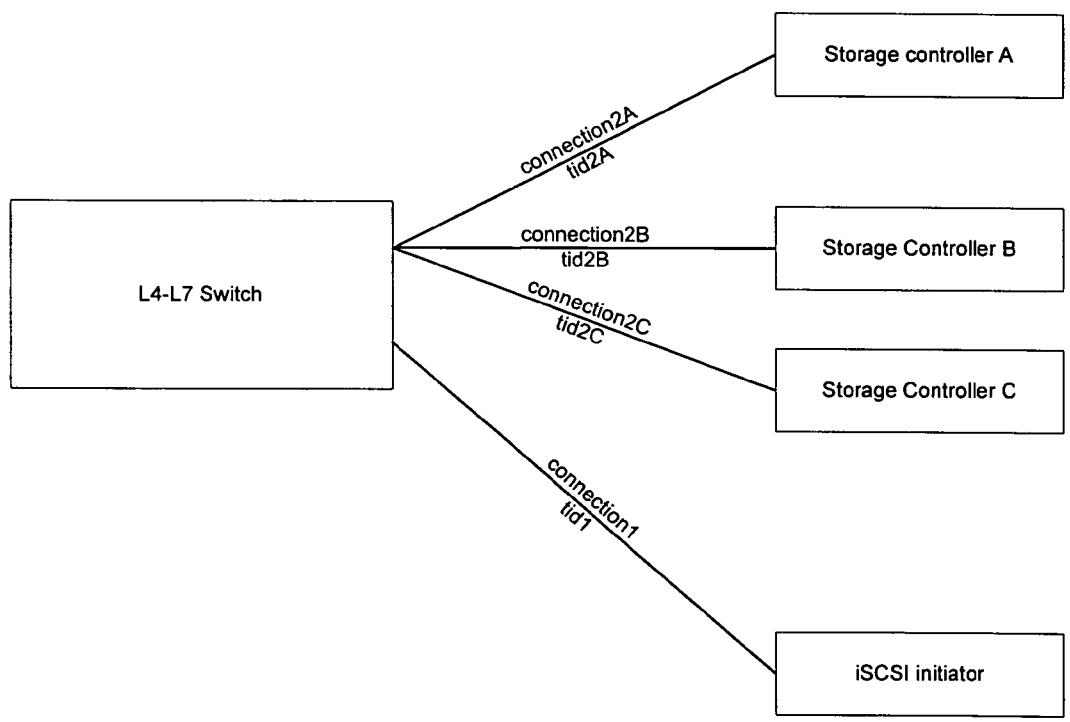
Figure 2b: one-to-many and many-to-one relations between the split connections within a L4-L7 switch

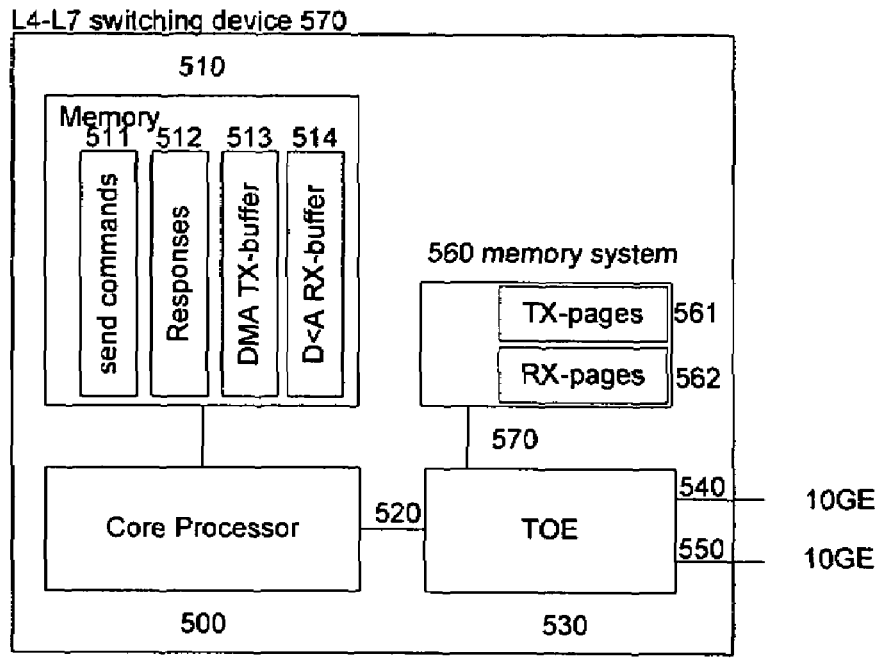
Figure 3a: Layer 4-7 switching device
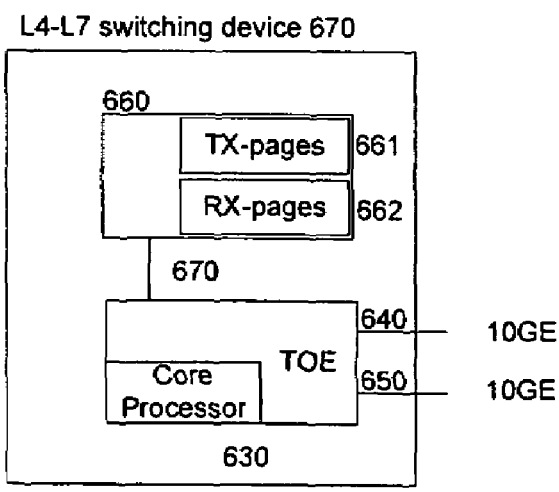
Figure 3b: Layer 4-7 switching device with no Core Processor

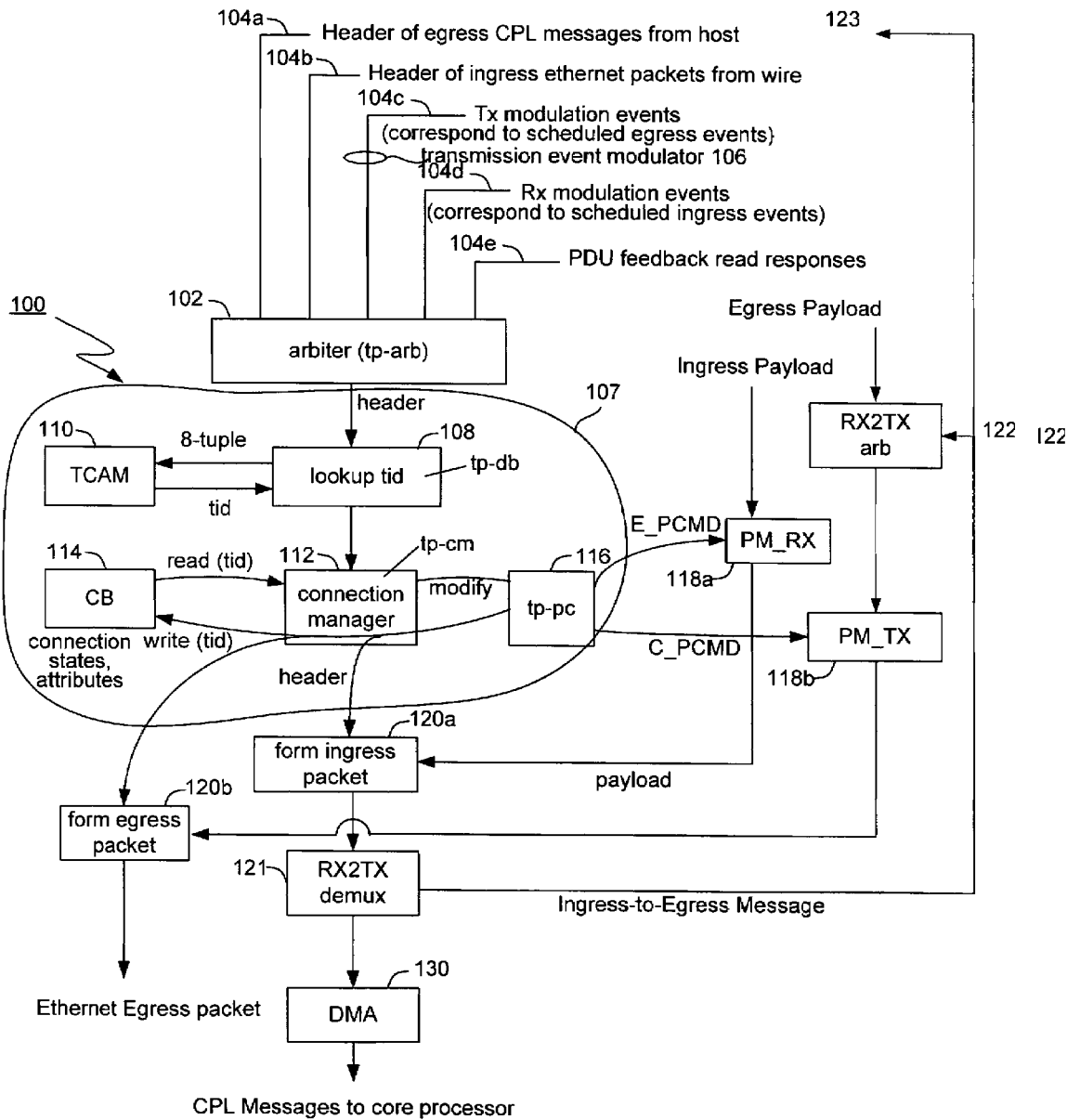
Figure 4: Flow Processor

METHOD TO IMPLEMENT AN L4-L7 SWITCH USING SPLIT CONNECTIONS AND AN OFFLOADING NIC

CROSS REFERENCE TO RELATED APPLICATIONS

The subject application is a Continuation-in-Part of pending U.S. application Ser. No. 11/330,898, filed Jan. 12, 2006 and entitled "Virtualizing the Operation of Intelligent Network Interface Circuitry", which is a Continuation-in-Part of pending U.S. patent application Ser. No. 11/313,003, filed Dec. 19, 2005 and entitled "A Method for Traffic Scheduling in Intelligent Network Interface Circuitry", which is a Continuation-in-Part of pending U.S. patent application Ser. No. 11/282,933, filed Nov. 18, 2005 and entitled "A Method for UDP Transmit Protocol Offload Processing with Traffic Management", which is a Continuation-in-Part of pending U.S. patent application Ser. No. 11/217,661, filed Aug. 31, 2005 and entitled "Protocol Offload Transmit Traffic Management", all of which are incorporated herein by reference for all purposes.

TECHNICAL FIELD

The present invention is in the field of intelligent network interface circuitry (NIC) (e.g., network interface cards and/or controllers) connectable to a core processor and, more particularly, relates to intelligent NIC that implements a protocol proxy in conjunction with protocol offload functionality.

BACKGROUND

Network protocols may be modeled as a layer of protocols from layer 1 to layer 7. For example, the IP protocol is modeled to be at layer-3, the TCP protocol is at layer-4, and various applications are at layer-7. The switching of network traffic using layer 4-7 information is well known.

A layer-4 switch, also sometimes referred to as a layer-4 load balancer, uses the four tuple information carried in a TCP/IP and UDP/IP packet to make a switching decision—for example, switching an incoming Web server request packet based on a hash of the four tuple information to one of the available server computers. As a result, processing load may be distributed across the available pool of servers, and this distribution of processing load is often called "load balancing."

A layer-4 Performance Enhancing Proxy (PEP) is a layer-4 switch that performs further processing of layer-4 information with the goal of improving the performance in specific networking environments. One type of proxy is a TCP proxy that splits a TCP connection and performs the TCP protocol processing on each part. In some environments, connection splitting is beneficial, particularly when used in conjunction with environment specific enhancements.

A typical use of a layer-4 PEP is to connect networks that have different characteristics—for example, to connect a LAN/MAN/WAN Ethernet network to a Wireless LAN (WLAN) or a satellite network. Required features of a standard conforming PEP is described in RFC3135, and includes, as a base requirement, to be able to switch the network traffic from a first TCP connection to a second TCP connection, and in addition to have support in the TCP protocol implementation for the different network types.

A PEP typically employs a fully featured high performance TCP stack in addition to the standard features of a high performance TCP implementation as defined by RFC793, RFC1122, RFC2525, RFC2988, RFC2414, RFC1323, RFC2581, and RFC2474. Additional features may include stretch ACK (ACK moderation) with per-connection configurable inter-ACK spacing for asymmetric channels. Other useful features include byte counting, rather than ACK counting, to improve the sender's behavior when the receiver is using stretch ACKs; RTT based send pacing to reduce burstiness over long distance paths and/or paths with limited buffering capacity; advanced congestion control schemes designed for long distance or high error rate links (such as High-Speed TCP, and rate-halving); and the ability to perform rate control rather than standard window based congestion control over links with relatively high error rates (for example, wireless links).

A layer-7 switch uses information at layers above layer-4 to make a switching decision. For example, it is common practice to distribute databases across the available servers and then to direct, also referred to as "to switch", the incoming request packets to the appropriate sever based on the data requested. For example, a database that stores street address map information might be distributed among several servers according to geographical location. A web server street-map-information request, in this case, is processed to determine the requested street address and, based on the requested street address, the request is switched to the appropriate server (i.e., the server that holds the street-map information for the requested address). The address information in this case is contained in layer-7 information such as an HTTP or XML request, that is encapsulated within L4 TCP payload, and the processing includes first processing the TCP payload, and then processing the layer-7 information within the TCP payload.

Another example of a layer-7 switch is an iSCSI storage switch that examines the iSCSI header and the SCSI Control Data Block (CDB) before deciding where to send the SCSI command. The switching decision in this case may be based on a switching table that associates SCSI storage blocks with a storage server and with a storage controller within that storage server. In this case, the switch examines the iSCSI header information and the CDB block information received on a TCP connection to make the switching decision to the appropriate storage node, based on the storage switching table. The processing may include first computing a cyclic redundancy check (CRC) on the iSCSI header and/or data information. The iSCSI switch in this example may either be centralized or distributed and form part of the storage controllers.

A protocol proxy may further be used in the role of a protocol "gateway". For the sake of illustration, an example layer 4 protocol gateway would receive data encapsulated in UDP payload on one "connection" (an association between two processes described by the 4-tuple source and destination IP addresses, and source and destination UDP port numbers) and forward at least a part of that data encapsulated in TCP payload on another connection. This allows the use of each protocol in the appropriate environment, and takes advantage of the benefits of the protocol without requiring it to be used end-to-end. In this specific example, the benefits of UDP, e.g. simplicity and low overhead, are obtained on the first connection (which could be over a reliable local area network), whereas the benefits of TCP, e.g. reliability and congestion control, are obtained on the second connection (which could be over the Internet at large).

SUMMARY

A method of operating intelligent network interface circuitry includes the network interface circuitry coupling a core processor to a network to facilitate communication over the network between the core processor and at least a first peer and a second peer. A first connection connects to the first peer and a second connection connects to the second peer. The network interface circuitry receives data packets from the first peer via the network on the first connection, according to a first particular protocol. The network interface circuitry processes the received data, including associating, with the second connection, data that is at least a portion of the data packets received on the first connection, such that the data received by the intelligent network interface circuitry on the first connection is switched to be outgoing from the intelligent network interface circuitry on the second connection, according to a second particular protocol.

BRIEF DESCRIPTION OF FIGURES

FIGS. 1a to 1c illustrate how TCP packets may be reordered in transit.

FIG. 2a illustrates an example configuration in which an L4-L7 switch connects two peers, and FIG. 2b illustrates an example configuration in which an L4-L7 switch may implement a one-to-many and many-to-one relationship between connections.

FIG. 3a is a block diagram illustrating an L4-L7 switching device in accordance with an example in which a core processor is separate from a TCP protocol offload engine (TOE), and FIG. 3b is a block diagram illustrating an L4-L7 switching device in accordance with an example in which the core processor is integrated (on the same chip) with the TOE.

FIG. 4 is a block diagram illustrating a flow processor architecture in the L4-L7 functionality may be accomplished.

DETAILED DESCRIPTION

In accordance with an aspect, layer-7 switch functionality is synergistically combined with that of a Protocol Enhancing Proxy (PEP) into a combined L4-L7 switching device.

We first point out that, in general, the TCP protocol payload is not guaranteed to arrive at its destination in the same order as the send order. As is well-known, this may result from TCP packets being lost in the network and subsequently being resent. In addition, packets may also be re-ordered en route from source to destination. This reordering is now discussed with reference to FIG. 1a, FIG. 1b and FIG. 1c.

We now turn to FIG. 1a, which illustrates an example of four TCP packets in send order of packet 0, packet 1, packet 2 and, finally, packet 3. FIG. 1b shows the reordering effect due to packet 1 initially being lost in transit and having to be subsequently resent, which leads to the arrival order of packet 0, 2, 3, and finally the retransmission of packet 1. FIG. 1c then shows the effect of packet 1 and 2 being reordered in transit from the source to destination, which leads to the arrival order of packet 0, 2, 1, and 3. It follows from these considerations that layer-7 requests, such as HTTP web server requests that are embedded (or encapsulated) within a TCP payload, are processed after the TCP receive processing is completed (also referred to as TCP termination). Even in the absence of re-ordering, it is possible that a layer-7 request spans two or more TCP packets. An HTTP request might, for example, start close to the end of packet 0 in FIG. 1 and also be partially contained in packet 1. In this case, the TCP stream of packets is processed first, before the processing of the layer-7 requests is performed.

In addition to the functionality discussed above, a layer-4 switch may implement Quality of Service (QoS) and traffic management functionality. The QoS and traffic management features can be used to pace packets for selected connections such that the packets are evenly distributed on the wire between the switch and the peers. A means of allowing the provisioning of the sender rate per class of connections, or per connection within a class enforces service level guarantees and can prevent buffer overflow in network devices on the connection path or in receivers that are slower than the sender. The capability to prioritize network traffic, into at least a latency sensitive and data mover classes is useful, for example, giving priority to the transmission and delivery of traffic for the latency-sensitive traffic over data mover traffic. This is useful, for example, to prioritize the delivery of latency sensitive voice traffic over data mover Web traffic in a converged services network.

One additional functionality which a layer 4 switch with TCP offload may perform is the processing of payload. It is thus possible to offload expensive per-byte processing such as but not limited to compression and extraction, encryption and decryption, and application level data integrity codes computation and checking.

Another useful functionality for a layer 4 switch is protocol translation, in order to use each protocol in the environment where its benefits are desirable. It is possible for example to perform TCP to UDP translation and vice versa, in order to use TCP in environments where reliability and congestion control are required, and UDP in say, reliable environments where simplicity is more desirable.

We now turn to FIG. 2a, which illustrates an example switch setup, and is referred to in the remainder of this discussion. In the FIG. 2a example, an L4-L7 switch is connected with peer1 via TCP connection 1, which is also referred to as the TCP connection with identifier tid1. Similarly, the L4-L7 switch is connected with peer2 via TCP connection2, which is also referred to using the identifier tid2. Both connection1 and connection2 are full-duplex connections such that TCP payload packets can flow from the L4-L7 switch to peer1 or peer2, and acknowledgment packets can flow in the direction opposite to that of the payload packets. The example L4-L7 switching action includes switching incoming traffic (to the L4-L7 switch) from connection1 to outgoing traffic on connection2, and conversely also includes switching incoming traffic on connection2 to outgoing traffic on connection 1.

As used in this present description and in the claims appended hereto (specifically, not necessarily including the "related applications" listed at the beginning of this description), the term "connection" refers to an association of data with particular source and destination indications. The term "connection" is not meant to require or imply a particular method or protocol for communication of the data from the source and destination. Thus, for example, even an association where data is transmitted by UDP, referred to traditionally as a "connectionless" protocol (since the state is not maintained) is covered by the term "connection" as used herein.

The association between connection1 and connection2 is itself the result of a procedure, which depends on the application of interest (layer-7 information). With respect to one example application, Network Address Translation, the association is established at connection initiation time and remains in effect for the lifetime of the connections.

Independently, while the FIG. 2a example illustrates a one-to-one association between two connections, other associations are possible and useful, such as one-to-many and many-to-one. In applications such as the storage switch described in the Background, the association is dynamic and one-to-many, and may change for every protocol data unit (PDU), as now discussed with reference to FIG. 2b. In the FIG. 2b example, the L4-L7 switch is, for example connected to an iSCSI initiator via connection1, and to three different iSCSI storage controllers via connection2A, connection2B, and connection2C. An iSCSI initiator request in this example, is switched to connection2A, connection2B, or connection2C depending on the location of the stored data that is being requested. In one example, the L4-L7 switch includes a table that relates the storage blocks (the stored data is stored in storage blocks) to the different storage controllers. The requested storage block is located using the table, and the request is directed to the controller that contains the located requested storage block. To illustrate an example of a many-to-one relation between the connections in a L4-L7 switch, for the storage controller reply direction, the reply data arrives via connection2A, connection2B, or connection2C (many) and the replies all go to the iSCSI initiator (to one) via connection1.

We now turn to FIG. 3a, which illustrates a layer 4-7 switching device 570 based on a TCP Protocol Offloading Engine (TOE) 530 which, in this example, has two 10 Gigabit Ethernet ports 540 and 550. The TOE also has a memory system 560 which typically contains a pool of equally sized send buffer pagers (TX pages 561) and a pool of equally sized receive buffer pages (RX pages 562). A send buffer for a particular offloaded connection typically includes a collection of TX pages, and a receive buffer for a particular offloaded connection typically includes a collection of RX pages. The pages are typically managed by a memory manager, which keeps a list of free pages, and access is typically by the use of page tables that are associated with each connection. The TX pages and the RX pages are shown in FIG. 3a as stored in off-chip memory, but these pages can in general be stored in on-chip memory and/or off-chip memory and/or in memory that is part of the core processor.

In some examples, the Core Processor and the TOE are integrated on the same chip, as is shown in FIG. 3b. The TOE 530 is typically connected to the Core Processor 500 via a physical or logical link 520. An example of a physical link is a peripheral bus such as the PCI bus, or a processor bus such as the Hyper-Transport bus, and an example of a logical link is a memory request/response bus within a memory controller of the Core Processor 500.

The Core Processor 500 also includes a memory subsystem 510 that can store (among other things) Direct Memory Access (DMA) transmit buffers 513 containing data that is to be DMA read by the TOE 530 (or DMA written by the Core Processor 500) and subsequently sent as egress network packets to one of the 10GE interfaces 540 or 550. The memory subsystem also contains DMA receive buffers 514, that are DMA written by the TOE 530 (or DMA read by the Core Processor 500) via the link 520. The memory subsystem also holds send commands 511, also referred to as DMA gather lists, that list the locations within the TX-buffers 513 of data that is to be DMA read by the TOE 530. The memory subsystem also holds responses 512, also referred to as completion events, that are DMA written by the TOE 530 indicating progress in processing the send commands 511 and also describing the location and length of the data that has been DMA written by the TOE 530 to the core processor memory 510.

The L4-L7 switching function, the iSCSI storage switch, and the TCP Proxy function 570 is implemented using two offloaded connections: connection1 that connects the TCP Proxy 570 with peer1, and connection2 that connects the L4-L7 switch 570 with peer2 (referring again to FIG. 2b). The two connections can be connected to the TOE 530 via the 10GE interface 540 or the 10GE interface 550. In one mode of operation, the receive data from one of the 10GE ports, for connection 1, is TCP processed by the TOE 530 and subsequently DMA-ed to the core processor RX-buffer 514, and a record containing the connection1 tag, and the location and length of the written data is written to the response buffer 512. Then a gather list is created for connection2 that contains the location of the data just DMA-written for connection2. The data has thus been effectively moved to the core processor TX-buffer 513 for connection2, and is subsequently DMA read by the TOE 530 from the core processor send buffer 513 to the TOE send buffer 561. The receive data for connection2 is likewise DMA-ed to the core processor RX-buffer 514. A response entry is written to the response area, then a gather list is created for connection1, which effectively moves the data to the core processor TX-buffer 513 for connection1. The data is subsequently DMA read by the TOE 530 to the transmit buffer 561.

The L4-L7 switch 570 is also responsible for the processing to accomplish switching between connection1 and connection2, for the flow control of the received data by managing the receive window size, and for the flow control relative to transmission of data in the TOE transmit buffers 561. For an aggregate network bandwidth of 10 Gigabit per second (Gbps), the Core Processor 500 memory bandwidth includes, at a minimum, 20 Gigabits of bandwidth to accommodate a single DMA data moving operation at 10 Gbps into the RX buffer 514 and another 10 Gbps DMA data moving operation from the TX-buffer 513 to the TOE send buffer 561.

A more efficient operation mode of L4-L7 switch operates to move the data directly from the receive buffer 562 for connection1 (connection2) to the transmit buffer 561 for connection2 (connection1) (referred to as the zero-copy MOVE-option). An even more efficient operating mode operates to comingle the receive buffer for connection 1 and the send buffer for connection2, and the receive buffer for connection2 and the send buffer for connection1 (referred to as the zero-copy SHARE-option). The zero-copy here refers to the number of times that the data uses the Core Processor Memory 510 interface.

The zero-copy MOVE-option has an advantage of allowing the editing of the L5-L7 headers as they pass from connection1 to connection2 (or from connection2 to connection1). An advantage of the zero-copy SHARE-option is that it requires just one half the memory bandwidth in the TOE for the switching operation. That is, the zero-copy MOVE-option uses one write and one read to the RX-pages buffer 562, and another write and read to and from the TX-pages buffer 561. By contrast, the zero-copy SHARE-option just writes the received data once to the receive buffer of the first connection and reads the data once when sent from the second connection to the second peer.

With reference to FIG. 4, we now describe an example architecture of a flow processor architecture of the interface device 100, having a capability to implement an L4-L7 switch to accomplish the zero-copy MOVE-option. An arbiter 102 arbitrates among various signals such as headers of control messages from a core processor (104a), data packets from the network (104b), transmission modulation event tokens (104c), receive modulation event tokens (104d), and Protocol Data Unit (PDU) feedback read responses (104e). The transmission modulation event tokens are associated with transmission traffic management functionalities, and the receive modulation event tokens with receive traffic management functionalities, respectively. The PDU 104e feedback read responses contain the first eight bytes of a PDU read from a per-connection receive buffer, or per-connection send buffer, which is used to determine the header length and the payload length of a particular PDU in the case where messages sent to the core processor should be PDU aligned, or when the egress TCP segments should be PDU aligned.

It is noted that the arbiter 102 is a feature of the particular flow processor architecture of the FIG. 4 circuitry and typically has only an indirect effect on the layer 4-7 switch function.

When the arbiter 102 operates to allow an ingress Ethernet packet through into the processing pipeline, the protocol processing block 107 includes a database lookup block 108 that locates the state for an offloaded protocol, such as TCP. A packet is identified by the header, or headers, that the packet contains. As an example, the headers for Ethernet packets contain at least a protocol stack layer-2 Ethernet packet; and when the Ethernet packet encapsulates an IP packet, the packet also contains a layer-3 IP header; and when the IP header encapsulates a layer-4 TCP (or UDP) protocol, the packet also contains a TCP (UDP) header. For a TCP packet, a 4-tuple consisting of a source and destination IP address, and a source and destination TCP (UDP) port numbers is said to uniquely identify a point-to-point connection that uses the protocol. For offloaded connections, the lookup minimally considers the 4-tuple information, and it can optionally contain one or more components to facilitate such functions as server virtualization, Virtual LAN (VLAN) functionality, and per-packet filtering and re-write.

The lookup block 108 typically operates to match the protocol header, and optionally one or more other components as discussed above, to an internal identification ("tid," used by the interface device and the core processor) corresponding to a particular protocol or filtering rule Control Block (CB). In the FIG. 4 example, the lookup database is implemented with a TCAM memory, which allows looking up the location of a CB in pipelined fashion, with one tid result being returned from the TCAM every clock cycle after a pipeline startup delay. In place of the TCAM, other structures may be used, such as hashing or a search tree, or a combination of these methods, to implement the lookup function.

The lookup block 108 then provides the tid, received from the TCAM 110, to connection manager circuitry 112 that manages the connection state and attributes. In the FIG. 4 example, the connection state and attributes are in a Control Block (CB) 114. The connection manager 112 operates in concert with the payload command manager 116 to generate and provide separately ingress payload commands E_PCMD 118a to an ingress payload manager block, and egress payload commands C_PCMD 118b to an egress payload manager block 118b. We note that the TCP protocol is a full-duplex protocol and as such an ingress packet can both carry payload data, and acknowledgements for previously sent egress packets, on the same connection, and in this case an E_PCMD might for example write the ingress payload to the core processor, and the acknowledgement contained in the ingress packet can enable further sending of egress payload and a C_PCMD might then be issued to read payload from a per-connection send buffer to form an egress packet. The core processor, or core for short, refers to a host computer connected to the NIC, and/or an on-chip processor, or processor on the NIC card.

In particular, for offloaded connections, the connection manager provides the tid to the CB 114, and the CB 114 provides the current connection state and attributes for the connection (i.e., the connection to which the tid corresponds) to the connection manager 112. Based on the current connection state and attributes provided from the CB 114, the connection manager 112 determines that it corresponds to an offloaded connection, how to appropriately modify the connection state and provides, to the payload command manager 116, an indication of the modification to the connection state. Based on the indication of the modification, the payload command manager 116 issues, for example, an ingress message header to the form ingress packet block 120a.

The payload command manager 116 also issues one or more appropriate payload commands to the ingress payload manager block 118a to, for example, cause data to be written to the core processor or, when the data is not ready to be written to core, the payload command manager creates an Rx modulation event, which causes traffic management functionality to schedule later delivery to the core processor. For a TCP connection, the message to send payload to the core processor is, in one example, a CPL_RX_DATA message, indicating that the payload is to be written into an anonymous free-list buffer. The message can also indicate that the payload is to be directly placed in a specific location in the core memory. Furthermore, in an L4-L7 switching application, payload may be encapsulated in a CPL_RX2TX_DATA message indicating that the data is to be written to the send buffer for a particular connection.

The PM_TX 118b egress payload manager includes a send buffer that is organized as a pool of pages shared among the various offloaded connections. The core allocates pages in the send buffer to particular connections, and a CPL_TX_DATA_ACK message is sent back from the flow processor to the core processor. The core processor uses the CPL_TX_DATA_ACK message to determine when a page (or pages) is freed for reuse (by the same or a different connection). This typically occurs when the data payload stored in the pages has been acknowledged by the peer via TCP. The CPL_TX_DATA_ACK message contains the tid identifier, to enable determining which connection is freeing page(s). The core can thereby use the information contained in this message to adjust its information regarding the current size of the send buffer allocated to a particular connection.

When receive flow control is enabled for a particular connection, the CPL_RX_DATA_ACK message that is sent by the core to the connection manager is used by the connection manager to manage the size of the receive window for the individual connections. The receive window is initialized, at connection creation time, to a particular value that indicates the number of bytes that the peer is allowed to send to the connection. When a payload is sent to the core processor for a flow controlled connection, the size of the receive window for the connection is decremented by the size of the sent payload. The CPL_RX_DATA_ACK message, which includes a byte count parameter, is then used to increase the receive window size by the specified byte count to open up the receive window for a particular connection.

For offloaded connections, the connection manager 112 writes the modified connection state and attributes back into the CB 114. The read, modify and write of the connection state and attributes is done in an atomic operation. Here, atomic refers to the property that a read of the CB always returns the most recent state of the particular CB, even though the pipeline might be processing multiple messages simultaneously, that are associated with the same CB.

There are two form packet blocks—an ingress form packet block 120a and an egress form packet block 120b. The egress form packet block 120b combines headers for the various layers (e.g., Ethernet, IP, and TCP) the corresponding payload from the egress payload block 118b into an Ethernet packet for transmission to the wire. The ingress form packet block 118a combines a CPL message header such as the CPL_RX_DATA or CPL_RX2TX_DATA headers with the ingress payload from the ingress payload block PM_RX 118a, and typically sends the message to the core, for example, in the case of a CPL_RX_DATA message.

For a CPL_RX2TX_DATA message, the RX2TX de-multiplexer block 121 processes the message, such that the header is re-written as a CPL_TX_DATA message 123. The header is injected into the arbiter 102 as a simulated egress CPL message from the core, and the CPL_RX2TX_DATA payload is injected by the RX2TX arbiter 122 as simulated egress payload into the egress PM_TX 118b payload manager. The ingress payload is thus moved from an ingress payload buffer for one connection to an egress payload buffer for another connection. The CPL_RX2TX_DATA header contains the tid for the egress connection that is to send the data payload, and this tid value is stored as part of the CB for the ingress connection.

We now discuss how the L4-L7 switching action is carried out in one operating mode. When a TCP connection setup request is received from peer1, the static L4-L7 switching is implemented by opening a first connection connection1 to peer1 and a second connection connection2 to peer2. The core is involved in the management of the receive window of connection 1 and the send window of connection2 and, similarly, the receive window of connection2 and the send window of connection1. Also, in a static mapping mode of operation, the tid of connection2 is stored within the CB state of connection 1, to allow filling in the tid field of the CPL_RX2TX_DATA message that sends the ingress payload from connection 1 to connection2. Similarly, the tid of connection1 is stored within the CB state of connection2 to allow formulating the CPL_RX2TX_DATA message that sends ingress payload from connection2 to connection1.

In another operating mode, a dynamic L4-L7 switching capability is implemented by viewing the TCP bytes stream as a sequence of application layer data units (PDU), each including a PDU header and PDU payload. The flow processor delivers ingress data in the core direction in two phases. In the first phase, the PDU header phase, a specified number of bytes is delivered to the core. In the PDU-payload phase, a specified number of payload bytes is delivered to the core or to another connection. The header phase may be repeated more than once for a particular PDU. For example, for iSCSI PDU's that have an auxiliary header, the first header phase would be utilized to determine the size of the auxiliary header, and the second header phase would then deliver the auxiliary header. The payload size is typically determined upon further examination of the header bytes. This determination may be done by the core processor or by the protocol processing block in the TOE.

The header delivery phase has the per-connection configurable option of adjusting the receive buffer by the amount of bytes that are sent to the core or, alternately, just delivering a copy of the header to the core while preserving the receive buffer as is. The first option may be used, for example, when the core might edit the header information, before forwarding it, in which case the modified header is written to the send buffer of switched-connection by writing the tid of the destination connection into the ingress connection, before the PDU-payload is forwarded to the destination connection. The copy option is more efficient when the core does not modify the header, in which case the flow processor is instructed to forward a specified number of bytes to connection2. After forwarding the specified number of bytes, the ingress operation switches again to the header phase.

What is claimed is:

1. A method of operating intelligent network interface circuitry, wherein the network interface circuitry couples a core processor to a network to facilitate communication over the network between the core processor and at least a first peer and a second peer, wherein a first connection connects to the first peer and a second connection connects to the second peer, a plurality of connections, including the second connection, connecting to a plurality of separate peers, the method comprising:
by the network interface circuitry,
receiving data packets from the first peer via the network on the first connection, according to a first particular protocol; and
processing the received data, including associating, with the second connection, data that is at least a portion of the data packets received on the first connection, such that the data received by the intelligent network interface circuitry on the first connection is switched to be outgoing from the intelligent network interface circuitry on the second connection, according to a second particular protocol
wherein
the first particular protocol operates at no higher than layer 4, and
processing the received data includes processing the packets at higher than layer 4, wherein the associating is based on a result of processing the layers higher than layer 4 to determine which of the plurality of connections is the second connection.

2. The method of claim 1, wherein:
the network interface circuitry includes a pipelined processor circuitry configured to process data received by the network interface circuitry from the core for transmission to a peer via one of the connections and also to process data received by the network interface circuitry via one of the connections for receipt by the core; and
associating, with the second connection, data that is at least a portion of the data packets received on the first connection includes generating data by the core processor, to be delivered on the second connection.

3. The method of claim 1, wherein:
associating, with the second connection, data that is at least a portion of the data packets received on the first connection includes placing the data in a transmit buffer associated with the second connection.

4. The method of claim 3, wherein:
the data is placed in the transmit buffer associated with the second connection without storing the data in a receive buffer associated with the first connection.

5. The method of claim 3, wherein:
placing the data in a transmit buffer associated with the second connection includes appending the data to data already in the transmit buffer associated with the second connection.

6. The method of claim 1, wherein:
the data received from the first peer via the network on the first connection is payload data included in data packets received from the first peer associated with the first connection;
the first connection and the second connection are full duplex, and
the method further comprises, by the intelligent network interface circuitry
receiving data packets from the second peer on the second connection;
associating, with the first connection, the data packets received on the second connection, such that the data incoming to the intelligent network interface circuitry on the second connection is switched to be outgoing from the intelligent network interface circuitry on the first connection.

7. The method of claim 1, wherein:
processing at least a portion of data packets received on the first connection to determine which of the plurality of connections is the second connection includes
the network interface circuitry providing the at least a portion of the data packet, corresponding to higher than layer 4 and received on the first connection to the core processor; and
the core processor provides an indication to the network interface circuitry of the determination of which of the plurality of connections is the second connection.

8. The method of claim 7, wherein:
the network interface circuitry providing the at least a portion of the data packet received on the first connection to the core processor includes delineating at least one protocol data unit in the data received on the first connection; and
the at least a portion of the data packet received on the first connection is at least a portion of the at least one protocol data unit delineated by the network interface circuitry.

9. The method of claim 1, wherein:
the network interface circuitry determines which of the plurality of connections is the second connection by processing the at least a portion of the data packet, corresponding to higher than layer 4 and received on the first connection in view of control information associated with the connections.

10. The method of claim 1, wherein:
the portion of the data packets processed for associating the received data with the second connection includes a portion of the data packets associated with layer 5 to 7 packet headers.

11. The method of claim 10, wherein:
the portion of the data packets associated with layer 5 to 7 packet headers includes iSCSI packet headers.

12. The method of claim 11, wherein:
the plurality of separate peers to which the plurality of connections connect are storage controllers.

13. The method of claim 1, wherein:
the processing of at least a portion of data packets received on the first connection to determine which of the plurality of connections is the second connection is on a per Protocol Data Unit basis in at least one of layers 5-7.

14. The method of claim 13, wherein:
the portion of the data packets associated with layer 5 to 7 packet headers includes iSCSI packet headers.

15. The method of claim 1, further comprising:
performing supplemental processing on the data provided on the second connection, not associated with switching the data.

16. The method of claim 15, wherein the supplemental processing includes verifying the integrity of the received data.

17. The method of claim 16, including:
inserting, into the received data, a result of computing the integrity of the received data.

18. The method of claim 15, wherein the supplemental processing includes at least one of encryption/decryption and compression/decompression.

19. The method of claim 1, wherein:
the first protocol and the second protocol are variants of the same protocol with environment specific optimizations.

20. The method of claim 1, wherein:
the first protocol and the second protocol are variants of the same protocol configured differently.

21. A method of operating intelligent network interface circuitry, wherein the network interface circuitry couples a core processor to a network to facilitate communication over the network between the core processor and at least a first peer and a second peer, wherein a first connection connects to the first peer and a second connection connects to the second peer, the method comprising:
by the network interface circuitry,
receiving data packets from the first peer via the network on the first connection, according to a first particular protocol; and
processing the received data, including associating, with the second connection, data that is at least a portion of the data packets received on the first connection, such that the data received by the intelligent network interface circuitry on the first connection is switched to be outgoing from the intelligent network interface circuitry on the second connection, according to a second particular protocol, wherein:
the network interface circuitry includes a pipelined processor circuitry configured to process data received by the network interface circuitry from the core for transmission to a peer via one of the connections and also to process data received by the network interface circuitry via one of the connections for receipt by the core; and
associating, with the second connection, data that is at least a portion of the data packets received on the first connection includes generating data by the core processor, to be delivered on the second connection; and
wherein the pipelined processor circuitry includes
ingress form packet circuitry configured to form ingress packets, from data received from the network, to provide to the core;
egress form packet circuitry configured to form egress packets, from data received from the core, to provide to the network;
intercept and redirect circuitry to selectively intercept packets from the ingress form packet circuitry, formed by the ingress form packet circuitry based on data received on the first connection, and to provide a message to the pipelined processor circuitry simulating a message from the core instructing the pipelined processor circuitry to provide the data of the ingress packets, from the ingress form packet circuitry based on data received on the first connection, to be redirected to the egress form packet circuitry to form egress packets to be delivered on the network on the second connection.

22. The method of claim 21, wherein:
an identification of the second connection is stored in the network interface circuitry in a control block associated with the first connection.

23. The method of claim 21, wherein:
the first particular protocol operates at no higher than layer 4, and
processing the received data includes processing the packets at higher than layer 4, wherein the associating is based on a result of processing the layers higher than layer 4.

* * * * *

UNITED STATES PATENT AND TRADEMARK OFFICE
CERTIFICATE OF CORRECTION

PATENT NO.       : 7,616,563 B1
APPLICATION NO.  : 11/356850
DATED            : November 10, 2009
INVENTOR(S)      : Eiriksson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 819 days.

Signed and Sealed this

Fourteenth Day of December, 2010

David J. Kappos
*Director of the United States Patent and Trademark Office*